United States Patent
Knipfer et al.

(10) Patent No.: US 8,108,263 B2
(45) Date of Patent: Jan. 31, 2012

(54) METHOD, SYSTEM, AND COMPUTER READABLE MEDIUM FOR GROUPING ORDERS AND CREATING SHORT ORDERS

(75) Inventors: Ivory Wellman Knipfer, Rochester, MN (US); Jason Scott Lee, Oronoco, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 11/624,781

(22) Filed: Jan. 19, 2007

(65) Prior Publication Data

US 2008/0177757 A1 Jul. 24, 2008

(51) Int. Cl.
*G06Q 30/00* (2006.01)
*G06F 17/30* (2006.01)
(52) U.S. Cl. ............. 705/26.2; 705/26.1; 705/26.8; 705/26.81; 705/28
(58) Field of Classification Search ............ 705/26–29, 705/330–341
See application file for complete search history.

(56) References Cited

U.S. PATENT DOCUMENTS

| | | | |
|---|---|---|---|
| 6,963,847 B1* | 11/2005 | Kennedy et al. | 705/8 |
| 7,257,552 B1* | 8/2007 | Franco | 705/28 |
| 2001/0011232 A1* | 8/2001 | Peterson et al. | 705/26 |
| 2002/0046125 A1* | 4/2002 | Speicher et al. | 705/22 |
| 2002/0169679 A1* | 11/2002 | Neumayer | 705/26 |
| 2002/0188530 A1* | 12/2002 | Wojcik et al. | 705/28 |
| 2003/0018490 A1 | 1/2003 | Magers et al. | |
| 2004/0006528 A1* | 1/2004 | Kevin Fung | 705/37 |
| 2005/0119942 A1* | 6/2005 | Horrocks et al. | 705/26 |
| 2006/0064344 A1 | 3/2006 | Lidow | |
| 2006/0218058 A1 | 9/2006 | Wojcik et al. | |
| 2007/0129964 A1* | 6/2007 | Helmolt et al. | 705/1 |
| 2007/0129984 A1* | 6/2007 | von Helmolt et al. | 705/8 |

OTHER PUBLICATIONS

A new balance to warehousing and distribution Boggs, Kathryn C. IIE Solutions. Norcross: Aug. 1995. vol. 27, Iss. 8; p. 24, 5 pgs.*

* cited by examiner

*Primary Examiner* — Will Allen
(74) *Attorney, Agent, or Firm* — Yee & Associates, P.C.; Steven L. Bennett (57) ABSTRACT

A computer implemented method, apparatus, and computer program product for grouping orders. One or more original orders are received. The one or more original orders are grouped using grouping rules to form a set of grouped orders. Upon determining that the set of grouped orders cannot be completely filled, at least one short order is created. The at least one short order is grouped with the set of grouped orders using grouping rules to form a set of consolidated orders.

19 Claims, 4 Drawing Sheets

TABLE OF GROUPING RULES — 400

| | PN (PART NUMBER) | COUNTRY | CUSTOMER | GROUPING ALLOWED | DAYS | <MEANING> |
|---|---|---|---|---|---|---|
| RULE 402 | PN 12345 | *ALL | *ALL | Y | 7 | PN 12345 IS ALWAYS GROUPED REGARDLESS OF COUNTRY AND CUSTOMER WITHIN A 7 DAY TIME FRAME. |
| RULE 404 | PN 67890 | USA | *ALL | Y | 7 | PN 67890 IS ONLY GROUPED IF THE ORDER IS GOING TO THE USA WITHIN A 7 DAY TIME FRAME. |
| RULE 406 | PN 11111 | *ALL | ALPHA INC. | Y | 5 | PN 11111 IS GROUPED ONLY FOR ALPHA INC. WITHIN A 5 DAY TIME FRAME. |
| RULE 408 | PN 22222 | *ALL | *ALL | N | | PN 22222 IS NEVER GROUPED. |
| RULE 410 | PN 33333 | *ALL | BETA INC. | N | | PN 33333 IS NEVER GROUPED FOR BETA INC. (OVERRIDES ANY OTHER RULE FOR PN 33333 FOR BETA INC. SUCH AS THE FOLLOWING RULE) |
| RULE 412 | *ALL | USA | *ALL | Y | 5 | ALL PNs IN THE USA ARE GROUPED WITHIN A 5 DAY TIME FRAME. UNLESS A MORE SPECIFIC RULES IS FOUND FOR A PN AND CUSTOMER SITUATION OVERRIDING THIS GENERAL RULE. |
| RULE 414 | *ALL | USA | BETA INC. | N | | ALL PNs IN USA FOR BETA INC. ARE NOT GROUPED NOTE: THIS RULE ALONG WITH PN 33333 ARE REDUNDANT BUT PN33333 COULD HAVE INDICATED YES AS IN THE FOLLOWING RULE. |
| RULE 416 | *ALL | *ALL | BETA INC. | Y | 14 | ALL PNs FOR BETA INC. ARE GROUPED WITHIN A 14 DAY TIME FRAME. HOWEVER THE PREVIOUS RULE INDICATES THIS ONLY APPLIES TO ALL NON-USA COUNTRIES. |
| RULE 418 | *ALL | *ALL | *ALL | Y | 7 | THE GENERAL RULE FOR ALL PNs IS TO GROUP WITHIN A 7 DAY TIME FRAME. |

NOTES: *ALL IS A WILDCARD USED TO MINIMIZE DATA ENTRY AND MAINTENANCE.

FIG. 6

METHOD, SYSTEM, AND COMPUTER READABLE MEDIUM FOR GROUPING ORDERS AND CREATING SHORT ORDERS

BACKGROUND OF THE INVENTION

1. Field of the Invention

The present invention relates generally to data processing systems, and in particular to order management systems. Still more particularly, the present invention relates to a computer implemented method, apparatus, and computer program product for production order grouping using grouping rules.

2. Description of the Related Art

When a manufacturer receives an order, the order is often entered into an order management system, such as a Materials Resource Planning (MRP) system. The Materials Resource Planning system creates a unit of work within the order to fulfill each portion of the order. Currently, once the order is entered into the Materials Resource Planning system, the order should be shipped "as ordered". The current method of processing an order only works in an ideal world where there are no parts shortages and all orders can be fulfilled on time and as placed.

Often, however, different issues can complicate the fulfillment of an order. For example, an inventory shortage or a quality issue may result in an initial order being short shipped. Short shipped means that only a portion of the ordered units are shipped to the buyer, leaving part of the initial order to be filled at a later date. When this happens, there is no way to group the unfulfilled portion of the order with new orders or with backlogged orders that have similar shipment characteristics. As a result, manufacturing is left with many fragments of individual shipments for the remaining portions that have been unfulfilled.

BRIEF SUMMARY OF THE INVENTION

The different embodiments provide a computer implemented method, apparatus, and computer program product for grouping production orders. One or more original orders are received. The one or more original orders are grouped using grouping rules to form a set of grouped orders. Upon determining that the set of grouped orders cannot be completely filled, at least one short order is created. The at least one short order is grouped with the set of grouped orders using grouping rules to form a set of consolidated orders.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
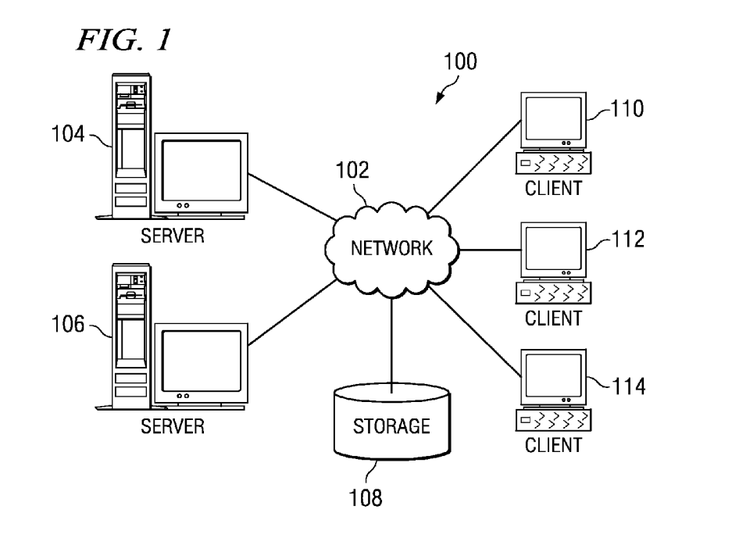
FIG. 1 is a pictorial representation of a network of data processing systems in which illustrative embodiments may be implemented.
Figure 2:
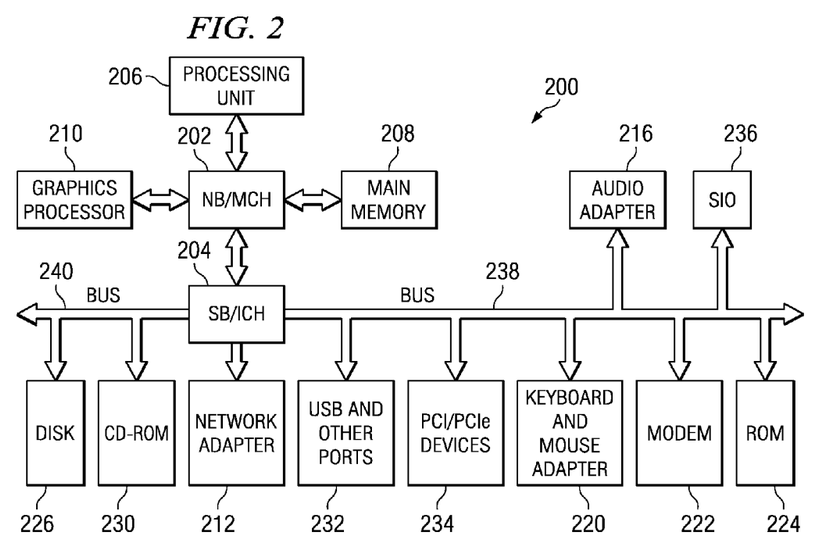
FIG. 2 is a block diagram of a data processing system in which illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1 and 2 and above-described examples are not meant to imply architectural limitations. For example, data processing system 200 also may be a tablet computer, laptop computer, or telephone device in addition to taking the form of a PDA.

When a purchaser sends an order to a manufacturer, the manufacturer usually enters the order into an order management system. The order management system creates a unit of work within the order to fulfill each portion of the order. Once the order is entered into the order management system, the order must be shipped "as ordered". Therefore, conventional order processing is optimized only for filling a single order as the purchaser ordered it.

Many times, however, different issues arise to prevent an order from being completely filled. For example, an inventory shortage due to quality issues may result in an initial order being short shipped. Short shipped means that only a portion of the ordered units are shipped to the buyer, leaving part of the initial order to be filled at a later date using a short order. When an initial order is short shipped, the unfulfilled portion of the initial order is viewed individually. When the unfulfilled portion of the initial order is filled, other unfulfilled orders and new orders arriving after the initial order are not taken into account. As a result, when shipments are short shipped, manufacturing is left with numerous unfulfilled fragments of individual shipments. The different embodiments recognize that it would be useful if unfulfilled portions of an initial order could be grouped using grouping rules with other unfulfilled portions of the initial order and with orders received after the initial order.

The different embodiments described herein provide a computer implemented method, apparatus, and computer program product for grouping production orders. One or more original orders are received. The one or more original orders are grouped using grouping rules to form a set of grouped orders. Upon determining that the set of grouped orders cannot be completely filled, at least one short order is created. The at least one short order is grouped with the set of grouped orders using grouping rules to form a set of consolidated orders.

Figure 3:
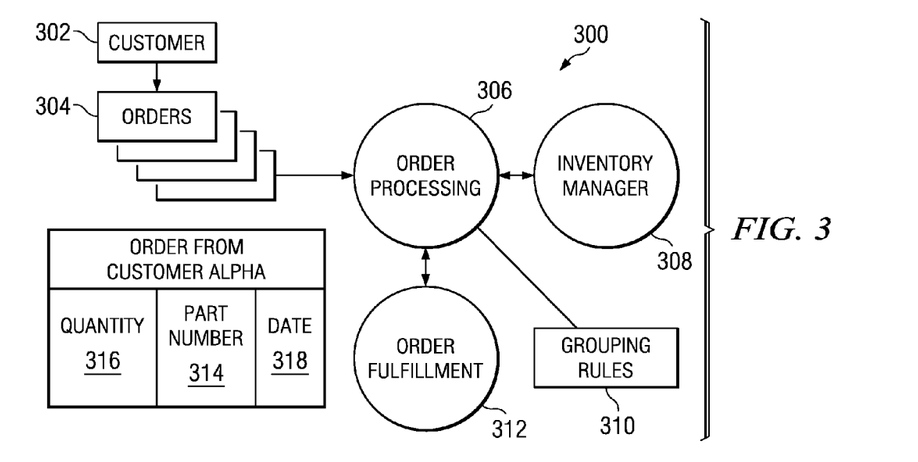
FIG. 3 is a block diagram of a resource planning system in accordance with an illustrative embodiment.

With reference now to FIG. 3, a block diagram of a resource planning system is depicted in which illustrative embodiments may be implemented. In resource planning system 300, customer 302 generates one or more orders 304. The resource planning system may be implemented using manufacturing resource planning (MRP) software, such as Systems Applications and Products (SAP®) or Oracle®, or in a downstream enterprise resource planning (ERP) software.

Of course, it should be understood that there may be more than one customer, with each customer generating a set of orders. Only one customer is shown in FIG. 3 for the sake of clarity. A set of orders is one or more orders.

Orders 304 are entered into order processing 306 for processing. Orders 304 may be entered manually or electronically into order processing 306. Order processing 306 is a software program which processes orders, such as orders 304. Order processing 306 sends messages to another software program, inventory manager 308, to determine which parts in orders 304 are currently available and which are not.

Order processing 306 uses grouping rules 310 to group a short order in which the entire order was not filled with other orders. Order processing 306 also communicates with order fulfillment 312, a software process which fulfills orders for which there is inventory available. Each order from a customer contains a list of part numbers 314 and quantity 316 ordered for that part number. In some orders, the customer may also specify date 318 by which the customer would like to receive the parts.

The grouping rules provide information about which parts may be grouped together and which may not. For example, many customers prefer that orders for large parts and small parts not be mixed together, because when unpacking the order for the large parts, the customer's employees may overlook some of the small parts. Orders may be grouped based on a variety of factors, such as the part number, the destination, the ship date, and the customer's grouping preferences.

When order processing 306 processes orders 304 and determines that the entire order cannot be fulfilled, a short shipment often occurs. In a short shipment, order processing 306 sends a message to order fulfillment 312 to process the order for the quantity of available parts. Order processing 306 then creates a new order for the remaining parts. Meanwhile, customer 302 may continue to generate orders 304.

Order processing 306 uses grouping rules 310 to group the unfulfilled order resulting from the short shipment with new orders coming in. By grouping unfulfilled orders with new orders using the grouping rules, shipments may be grouped together using the grouping rules, resulting in more efficient inventory management and order processing.

The order as received is also known as the original order. When the original order cannot be completely filled, the original order results in a short shipment, in which the quantity of parts shipped is short of the quantity in the original order, and a short order, in which the unfulfilled quantity from the original order is shipped. When a short order, created in response to a short shipment, is grouped using the grouping rules with other short shipments from the original order, the order is said to be consolidated. When the short order is grouped using the grouping rules with newly received orders, the order is said to be cascaded.

Figure 4:
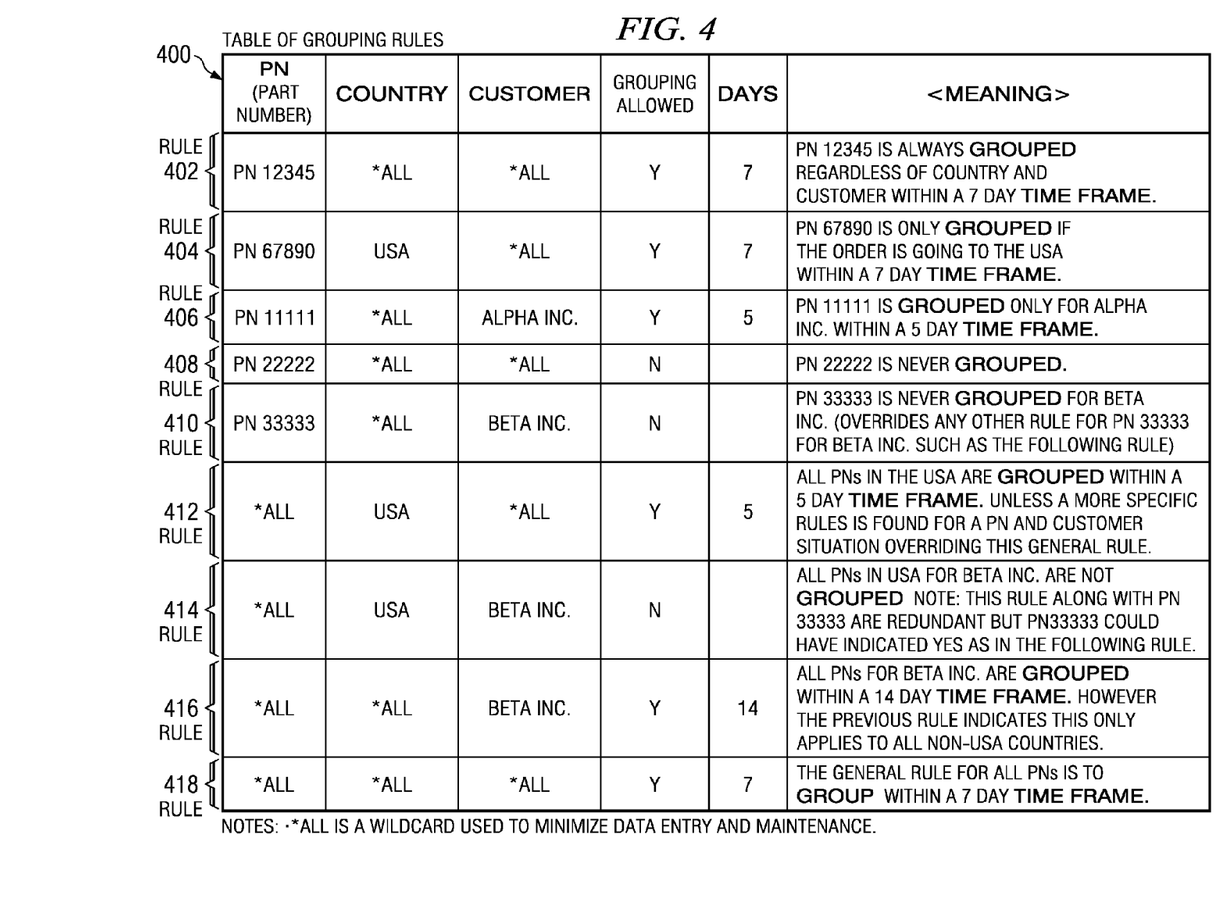
FIG. 4 is a table of grouping rules in accordance with an illustrative embodiment.

With reference now to FIG. 4, a table of grouping rules is depicted in which illustrative embodiments may be implemented. Table of grouping rules 400 contains rules for determining which part numbers can be grouped together for which customer. In this example, each rule in table of grouping rules 400 contains a part number, the country destination for which the grouping rule applies, the customer to whom the rule applies, the number of days during which grouping is allowed, whether grouping is allowed, and the meaning of each rule.

A part number references a specific manufactured unit. The manufactured unit may be an individual component or a pre-assembled item. A pre-assembled item may be completely assembled or partially-assembled.

The word "*ALL" is used in table of grouping rules 400 as a wildcard. The wildcard is used in a rule to indicate that the rule will apply to all parts, all countries, or all customers, depending on where the wildcard is placed. Those versed in the art will appreciate that any wildcard character or set of characters may be used as the wildcard.

Rule 402 has a wildcard for the country and the customer. Rule 402 therefore states that part number (PN) 12345 may be grouped for all customers in all countries within a seven day time horizon. For example, if customer A orders five hundred of part number 12345 and only three hundred parts are available to fill the order, then the order for the remaining two hundred parts may be grouped with any order for the same part number which comes in during the next seven day time frame. Thus, if the next day, customer B orders four hundred of part number 12345, the order for customer A may be grouped with the order for customer B to create an order for six hundred parts.

Rule 404 states that part number 67890 is grouped for all customers but only if the destination is the U.S.A. and only within a seven day time frame. Rule 406 states that part number 11111 is grouped only when the customer is Alpha and only within a five day time frame. Rule 408 states that part number 22222 is never grouped. Rule 410 states that part number 33333 is never grouped for customer Beta.

Rule 412 states that all part numbers destined to be shipped to the U.S.A. are grouped within a five day time frame. Note that rule 412 appears to conflict with rule 410 because both rule 410 and rule 412 apply to part number 33333. In case of a conflict where two or more rules apply to a particular part number, a rule which specifies a specific part number, country, or customer always overrides a rule with a wildcard as the part number, country, or customer.

In this example, rule 410 applies to a specific customer, Beta, while rule 412 applies to all customers because it has the wildcard as the customer. Therefore, in this example, rule 412 is overridden by another rule, such as rule 410. Rule 414 states that all part numbers for customer Beta which are destined for the U.S.A. are not grouped together. Rule 414 also overrides rule 410.

In this example, a first rule overrides a second rule if the first rule specifies a part number, country, or customer while the second rule uses a wildcard for the customer. Those versed in the art will appreciate that a mechanism for allowing one rule to override another rule or a set of rules may be implemented in many different ways.

For example, a binary override field may be added to each rule to indicate whether a rule is capable of overriding other rules. Alternately, a hierarchical rule tree may be constructed to indicate which rules take precedence over other rules. The rule tree would be traversed starting at the top, and in case of a conflict between two or more rules, the rule which is the highest in the tree would be applied, overriding any rules lower in the tree. In another implementation, the rules in the table could be organized based upon priority, with rules higher in the table getting priority over rules lower down in the table.

Rule 416 states that all part numbers for company Beta are grouped within a fourteen day time frame. However, rule 414 overrides rule 416 because rule 414 specifies a country while rule 416 uses the wildcard as the country. Rule 416 states that all part numbers for company Beta are grouped together within a fourteen day time frame, only for non-U.S.A. destinations. Rule 418 states that all part numbers are grouped for all customers to all destinations within a seven day time frame unless another rule overrides rule 418.

Figure 5:
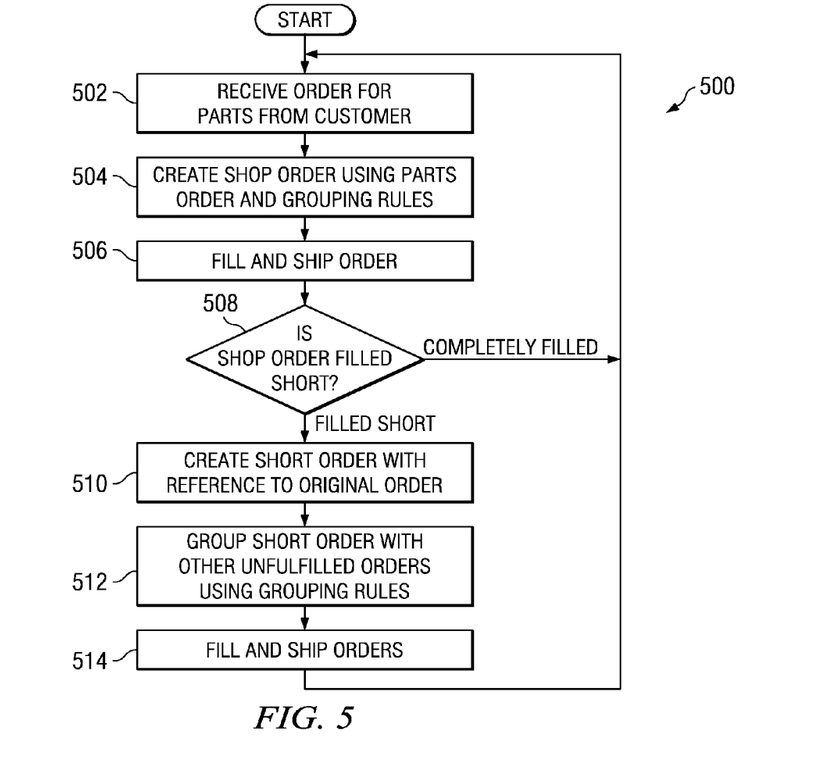
FIG. 5 is a flowchart of a grouping process in accordance with an illustrative embodiment.

With reference now to FIG. 5, a flowchart of a grouping process is depicted in which illustrative embodiments may be implemented. Grouping process 500 may be a software process, such as order processing 306 in FIG. 3, which uses the grouping rules to perform intelligent grouping of multiple orders.

The process begins when a parts order is received from a customer (step 502). The parts order and the grouping rules are used to create a shop order containing one or more part numbers (step 504). The shop order is filled and shipped (step 506).

A determination is made as to whether the shop order was completely filled or whether it was filled short (step 508). If the answer is "yes" and a determination is made that the shop order was completely filled in step 508, then the process goes back to receiving a new order (step 502). If the answer is "no" and a determination is made that the shop order was filled short in step 508, then a short parts order is created, where the short parts order references the original order (step 510). In a conventional system, when a shop order is short filled, a new parts order is created that does not reference the original order. Here, the short order references the original order, so that any constraints in the original order, such as ship date or destination country may be taken into account.

The short order is then grouped with other unfulfilled orders using the grouping rules (step 512). The unfulfilled orders may be (1) other short orders from different orders, (2) new shop orders that have been received, or (3) a combination of other short orders and new shop orders. The grouping rules are used to determine which orders may be grouped together. The grouped orders are filled and shipped (step 514), and the process goes back to receiving orders from customers (step 502).

Figure 6:
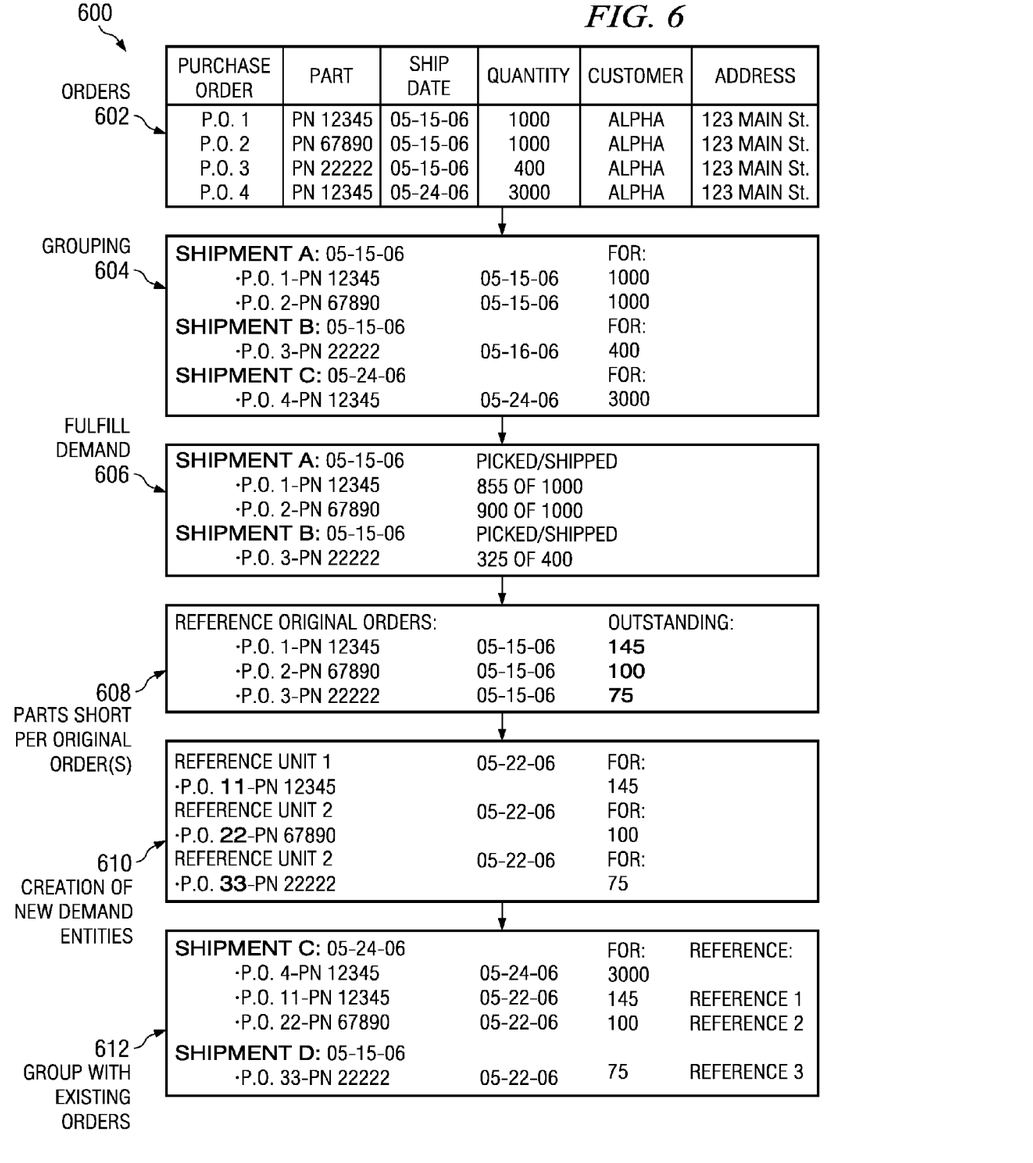
FIG. 6 is a block diagram of a grouping process in accordance with an illustrative embodiment.

With reference now to FIG. 6, a block diagram of a grouping process is depicted in which illustrative embodiments may be implemented. In block diagram of a grouping process 600, the grouping rules from FIG. 4 and the flowchart from FIG. 5 are used to demonstrate how the grouping process works.

Orders 602 contains four purchase orders. Orders 602 contains purchase orders for 1000 of part number 12345 to be shipped by May 15, 1000 of part number 67890 to be shipped by May 15, 400 of part number 22222 to be shipped by May 15, and 3000 of part number 12345 to be shipped by May 24. In this example, all the purchase orders are from customer Alpha. However, those versed in the art will appreciate that purchase orders from multiple customers may be grouped in a similar manner.

In grouping 604, the purchase orders are grouped based on the grouping rules in FIG. 4. The orders for 1000 of part number 12345 and 1000 of part number 67890 are grouped together into one shipment based on rules 402 and 404 in FIG. 4. The order for part number 22222 is shipped separately because rule 408 in FIG. 4 specifies that part number 22222 is never grouped together with other orders. The order for 3000 of part number 12345 is not grouped together with the other orders because the ship date is May 24, which is greater than the seven day time frame permitted for grouping in rules 402 and 404 in FIG. 4.

In fulfill demand 606, an attempt is made to fulfill the orders created in grouping 604. Here, 1000 of part 12345 were ordered but only 855 are being shipped, 1000 of part 67890 were ordered but only 900 are being shipped, and 400 of part 22222 were ordered but only 325 are being shipped.

In parts short per original orders 608, the number of parts each order is short is calculated. In creation of new demand entities 610, new orders for the shorted items are created in which the new orders refer to the original orders, and new ship dates are calculated using information such as manufacturing times. Here, the new ship dates are May 22, a week later than the original ship date of May 15.

In group with existing orders 612, the short orders are grouped with existing orders and any new orders which have been received. In this example, for simplicity, no new orders have been received and so the short orders are grouped with existing orders. In orders 602, 3000 of part number 12345 were ordered for shipment on May 24. Because the new ship date of May 22 falls within a seven day time frame of May 24 in group with existing orders 612, the short orders for 145 of part number 12345 and 100 of part number 67890 may be grouped together with the original order for 3000 of part number 12345.

In group with existing orders 612, the short order for part number 12345 and 67890 are grouped together with the original order for part number 12345 using rules 402 and 404 in FIG. 4, which allows grouping within a seven day time frame. However, in group with existing orders 612, the short order for 75 of part number 22222 is not grouped with any other order because of rule 408 in FIG. 4.

The different embodiments described herein provide a computer implemented method, apparatus, and computer program product for grouping production orders. One or more original orders are received. The one or more original orders are grouped using grouping rules to form a set of grouped orders. Upon determining that the set of grouped orders cannot be completely filled, at least one short order is created. The at least one short order is grouped with the set of grouped orders using grouping rules to form a set of consolidated orders.

The embodiments provide for a variety of benefits. For example, when an initial order is received and an error condition such as a short shipment is encountered, a new order for the unfilled quantity is automatically created. The new order is also called a short order. In contrast, in a conventional system when an error condition occurs, a new order for the unfilled quantity must be manually created. Orders may be grouped across various parameters, including sales orders, part numbers, within a customer, between customers, and across different delivery time frames.

Another advantage is that, by using the grouping rules, the short orders are automatically grouped with the unshipped portions of the initial order. The grouping rules specify whether or not an order for a specific part can be grouped, based on factors such as the time window within which the shipment will occur, the customer, and the destination of the shipment.

Any new orders automatically created as a result of an error condition are disassociated from the original order in that they are new orders and yet retain a reference to the original order. Thus, unique units of work for each part number, each associated with a unique sales order, are maintained within the grouped shop order. Because new orders are generated as a result of an error condition, such as a short order maintains a reference to the original order, the system provides total control over order alteration or cancellation.

For example, suppose a customer order for 1000 widgets results in 700 widgets being shipped and a short order for 300 widgets. Suppose the short order is grouped with a subsequent order for 500 widgets from the same customer. If the customer then wants to cancel the unfilled portion of the initial order because the short order references the initial order, the order for 300 widgets can be cancelled, leaving only the subsequent order for 500 widgets.

The embodiments allow order history and original ship dates to be traced and ensure first in, first out fulfillment for the grouped demand. Another advantage is the ability to reprioritize and fulfill outstanding demands independent of manufacturing, enabling manufacturing to run on a reasonable schedule while assuring real-time reprioritization. Demand can be filled before the next manufacturing run using available inventory.

Another advantage is that parts shortages become visible immediately to applications which are used to balance critical supplies and to chase additional supply when needed, such as when a supplier's commitment is not fulfilled as expected, parts are damaged, or quality issues render a previously reliable parts supply unavailable.

The embodiments eliminate manual order management activities and manual consolidation analysis. A manufacturer no longer needs to run time latent manufacturing resource planning (MRP) systems over and over again for the same customer sales order. Thus, customer satisfaction is improved by ensuring that short orders are immediately rolled and reprioritized in the manufacturing process. Late shipments may be grouped with other shipments created by newer orders to minimize delivery costs and improve the customer delivery experience.

Manufacturing can run uninterrupted when partial shipments are made (short shipped) ensuring a controlled process will capture the shortage and automatically create the appropriate dependent shop orders. The embodiments continually and automatically group partially filled orders with new orders while still keeping track of the original customer sales order. Depending on the grouping rules, multiple sales orders with multiple dates may be satisfied using a single shipment. The grouping rules allow shipments to be grouped based on various factors such as the customer, the shipment's destination, the part, or the time horizon.

An order is continually grouped until satisfied, altered, or cancelled. Short fill quantities are grouped to create new manufacturing entities or become part of an existing manufacturing entity with the same expected ship date and customer, or ship to address. In the above design, a grouped order maintains a reference to the original sales order that created the grouped order, so the original sales order can be managed from a sales order perspective.

In one implementation, the shop orders could be sorted by descending date at time of order creation. Alternately, a 'look backwards' approach could be used instead of the 'look forward' approach. Maintaining the original desired ship date allows the shop floor control to prioritize units within a shipment when parts are short. To ensure the highest priority demands, those which have missed their ship date by the greatest amount are filled first.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for grouping orders, the computer implemented method comprising:
   receiving one or more original orders;
   grouping the one or more original orders using grouping rules to form a set of grouped orders;
   upon a determination that at least one order in the set of grouped orders cannot be completely filled, creating at least one short order performed by the computer; and
   grouping, by the computer, the at least one short order with the set of grouped orders using the grouping rules to form a set of consolidated orders;
   wherein the at least one short order references a constraint from the one or more original orders, the constraint referenced in the at least one short order including at least a part number.

2. The computer implemented method of claim 1, wherein each order of the set of consolidated orders specifies at least a part number, a quantity, and a date from the one or more original orders.

3. The computer implemented method of claim 1, wherein the grouping rules comprise one or more rules, and wherein the grouping rules specify conditions which must be satisfied before the step of grouping the at least one short order with the set of grouped orders is performed.

4. The computer implemented method of claim 3, wherein the conditions specify a part number, whether or not the part number can be grouped, and at least one of a destination, a time frame, and a customer name.

5. The computer implemented method of claim 1, further comprising:
   receiving one or more new orders and grouping the one or more new orders with the set of consolidated orders using the grouping rules to form a set of cascaded orders.

6. The computer implemented method of claim 1, further comprising:

grouping the at least one short order with a grouped order shipping to a common destination.

7. The computer implemented method of claim 1, further comprising:
grouping the at least one short order with a grouped order shipping within a common, pre-determined time frame.

8. A computer program product comprising a nontransitory computer usable storage medium including computer usable program code for grouping orders, the computer program product comprising:
computer usable code for receiving one or more original orders;
computer usable code for grouping the one or more original orders using grouping rules to form a set of grouped orders;
upon a determination that at least one order in the set of grouped orders cannot be completely filled, computer usable code for creating at least one short order; and
computer usable code for grouping the at least one short order with the set of grouped orders using the grouping rules to form a set of consolidated orders;
wherein the at least one short order references a constraint from the one or more original orders, the constraint referenced in the at least one short order including at least a part number.

9. The computer program product of claim 8, wherein each order of the set of consolidated orders specifies at least a part number, a quantity, and a date from the one or more original orders.

10. The computer program product of claim 8, wherein the grouping rules comprise one or more rules, wherein the grouping rules specify conditions which must be satisfied before the step of grouping the at least one short order with the set of grouped orders is performed.

11. The computer program product of claim 10, wherein the conditions specify a part number, whether or not the part number can be grouped, and at least one of a destination, a time frame, and a customer name.

12. The computer program product of claim 8, further comprising:
computer usable code for receiving one or more new orders and grouping the one or more new orders with the set of consolidated orders using the grouping rules to form a set of cascaded orders.

13. The computer program product of claim 8, further comprising at least one of:
computer usable code for grouping the at least one short order with a grouped order shipping to a common destination; and
computer usable code for grouping the at least one short order with a grouped order shipping within a common, pre-determined, time frame.

14. A data processing system for grouping orders, the data processing system comprising:
a bus;
a storage device connected to the bus, wherein the storage device contains computer usable code;
a communications unit connected to the bus;
a processing unit connected to the bus for executing the computer usable code, wherein the processing unit executes the computer usable code to
receive one or more original orders;
group the one or more original orders using grouping rules to form a set of grouped orders;
upon a determination that at least one order in the set of grouped orders cannot be completely filled, create at least one short order; and
group the at least one short order with the set of grouped orders using the grouping rules to form a set of consolidated orders;
wherein the at least one short order references a constraint from the one or more original orders, the constraint referenced in the at least one short order including at least a part number.

15. The data processing system of claim 14, wherein each order of the set of consolidated orders specifies at least a part number, a quantity, and a date from the one or more original orders.

16. The data processing system of claim 14, wherein the grouping rules comprise one or more rules, and wherein the grouping rules specify conditions which must be satisfied before the processing unit executes computer usable code to group the at least one short order with the set of grouped orders.

17. The data processing system of claim 16, wherein the conditions specify a part number, whether or not the part number can be grouped, and at least one of a destination, a time frame, and a customer name.

18. The data processing system of claim 14, wherein the processing unit further executes the computer usable code to
receive one or more new orders; and
group the one or more new orders with the set of consolidated orders using the grouping rules to form a set of cascaded orders.

19. The data processing system of claim 14, wherein the processing unit further executes the computer usable code to
group the at least one short order with a grouped order shipping to at least one of a common destination, and within a common, pre-determined, time frame.

* * * * *